(12) United States Patent
Mottram et al.

(10) Patent No.: US 8,468,979 B2
(45) Date of Patent: Jun. 25, 2013

(54) COLLAR FOR AN ANIMAL

(75) Inventors: Toby Mottram, Glasgow (GB); Neil Telfer, Livingston (GB)

(73) Assignee: ITI Scotland Limited, Glasgow (GB)

( * ) Notice: Subject to any disclaimer, the term of this patent is extended or adjusted under 35 U.S.C. 154(b) by 490 days.

(21) Appl. No.: 12/528,915

(22) PCT Filed: Feb. 28, 2008

(86) PCT No.: PCT/GB2008/000685
§ 371 (c)(1),
(2), (4) Date: May 24, 2010

(87) PCT Pub. No.: WO2008/104787
PCT Pub. Date: Sep. 4, 2008

(65) Prior Publication Data
US 2010/0288208 A1    Nov. 18, 2010

(30) Foreign Application Priority Data

Feb. 28, 2007  (GB) .................................... 0703917.5
Aug. 24, 2007  (GB) .................................... 0716665.5

(51) Int. Cl.
*A01K 15/00* (2006.01)
(52) U.S. Cl.
USPC ........................................................ 119/859
(58) Field of Classification Search
USPC ................ 119/859, 856, 858, 863, 908, 718,
119/719, 720, 721; 340/573.2, 573.3, 573.4
See application file for complete search history.

(56) References Cited

U.S. PATENT DOCUMENTS

| 2,996,043 | A | * | 8/1961 | Pettingill ...................... 119/712 |
| 4,652,261 | A |   | 3/1987 | Mech et al. |
| 4,762,088 | A |   | 8/1988 | Chapman et al. |
| 5,000,125 | A |   | 3/1991 | Diekemper |
| 5,193,484 | A | * | 3/1993 | Gonda .......................... 119/859 |
| 5,195,455 | A | * | 3/1993 | van der Lely et al. ..... 119/14.03 |
| 5,207,178 | A |   | 5/1993 | McDade et al. |
| 5,241,923 | A | * | 9/1993 | Janning ......................... 119/721 |
| 5,349,926 | A | * | 9/1994 | McCarney et al. ........... 119/721 |
| 5,815,077 | A |   | 9/1998 | Christiansen |
| 6,536,377 | B2 | * | 3/2003 | Beaver .......................... 119/859 |
| 6,606,967 | B1 |   | 8/2003 | Wolfe et al. |
| 6,661,344 | B2 | * | 12/2003 | Bowling .................... 340/573.3 |

(Continued)

FOREIGN PATENT DOCUMENTS

EP    0551960 A    7/1993
GB    168534 A    9/1921

(Continued)

OTHER PUBLICATIONS

Search Reports, Great Britain Patent Application No. GB 0703917.5, Oct. 22, 2007 and Nov. 9, 2007.

(Continued)

*Primary Examiner* — Yvonne Abbott
(74) *Attorney, Agent, or Firm* — Vinson & Elkins L.L.P.

(57) ABSTRACT

A collar (1000) for an animal comprising an elongate strap member (1001) and at least a first and second housings (1011, 1013) at each end of said elongate strap member (1001), each of said first and second housings (1011, 1013) comprising interlocking means (1021, 1023) such that said first housing (1011) releasably engages said second housing (1013) in the proximity of the underside of an animal's neck when the collar (1000) is fitted around said animal's neck.

28 Claims, 16 Drawing Sheets

U.S. PATENT DOCUMENTS

| | | | |
|---|---|---|---|
| 6,830,014 B1 | 12/2004 | Lalor | |
| 6,970,090 B1* | 11/2005 | Sciarra | 340/573.1 |
| 7,008,075 B2* | 3/2006 | Simoni | 362/108 |
| 7,021,247 B1* | 4/2006 | Seeno et al. | 119/859 |
| 7,249,572 B2* | 7/2007 | Goetzl | 119/859 |
| 7,267,081 B2* | 9/2007 | Steinbacher | 119/858 |
| 7,574,979 B2* | 8/2009 | Nottingham et al. | 119/863 |
| 7,864,057 B2* | 1/2011 | Milnes et al. | 340/573.1 |
| 7,913,653 B2* | 3/2011 | Jordan | 119/859 |
| 7,992,525 B1* | 8/2011 | Fisher | 119/860 |
| 8,230,823 B2* | 7/2012 | Simoni | 119/859 |
| 2002/0050250 A1 | 5/2002 | Peterson et al. | |
| 2005/0138963 A1 | 6/2005 | Williams | |
| 2006/0102100 A1 | 5/2006 | Becker et al. | |

FOREIGN PATENT DOCUMENTS

| | | |
|---|---|---|
| GB | 2198924 A | 6/1988 |
| JP | 10160821 A | 6/1998 |
| WO | WO 90/12498 A | 11/1990 |

OTHER PUBLICATIONS

Search Reports, Great Britain Patent Application No. GB 0716665.5, Dec. 13, 2007.

International Search Report, International Patent Application No. PCT/GB2008/000685, Jul. 29, 2008.

International Preliminary Report on Patentability, International Patent Application No. PCT/GB2008/000685, Sep. 11, 2009.

* cited by examiner

COLLAR FOR AN ANIMAL

This application is a national stage application under 35 U.S.C. §371 of co-pending International Patent Application Number PCT/GB2008/000685, filed Feb. 28, 2008, which claims the benefit of Great Britain Patent Application Serial No. 0716665.5, filed Aug. 24, 2007, and Great Britain Patent Application Serial No. 0703917.5, filed Feb. 28, 2007, each of which is hereby incorporated by reference in their entireties, as if set forth below.

FIELD OF THE INVENTION

The present invention relates to a collar for an animal.

BACKGROUND OF THE INVENTION

Collars to be worn by animals are well known and are worn for many different purposes.

For example, U.S. Pat. No. 5,857,434 discloses a collar worn by an animal for the detection of oestrus. The collar has a single housing for the required electronics and batteries attached to a woven strap, which hangs from the underside of the animal's (cow) neck and swings with the motion of the animal like a pendant. For certain sensors, this pendulant motion can prove problematic. In particular 3-axis accelerometers can produce erroneous outputs of the actual movement of the animal due to the swing motion of the housing. Further the antenna for wireless communication is accommodated in the housing at the underside of the animal which is not ideal for the antenna to achieve a clean line of sight with fixed antennae making the wireless communication unreliable. Furthermore, the woven strap is prone to wear and stretches over time such that the collar becomes loose, which can be hazardous to the animal as well as increasing the pendulum motion of the housing. Further, natural growth or changes in the animal's health and well being, as well as natural variation in the sizes between animals, cause changes in the size of the animal's neck and hence the size of collar required.

With increasing sensory and circuitry required for many animal monitoring systems, the housings have become increasingly heavy and as the animal will invariably rub it's neck against posts, feeding grills etc, the combination of the weight of the housing, loose straps and swing motion of the housing, the collar can cause severe abrasions and discomfort to the animal as well as severe damage to the sensory platform and circuitry and damage to collar.

SUMMARY OF THE INVENTION

Therefore, it would be desirable to provide a collar for an animal which has a good fit so that it does not cause discomfort or abrasions to the animal and also minimises erroneous sensory data and improves wireless communication.

This is achieved according to a first aspect of the present invention by a collar for an animal comprising: an elongate strap member; and at least a first and second housings at each end of said elongate strap member, each of said first and second housings comprising interlocking means such that said first housing releasably engages said second housing in the proximity of the underside of an animal's neck when the collar is fitted around said animal's neck.

The first and second housings provide a ballast at the underside of the animal's neck to maintain stability of the collar and reduce slippage. Interlocking of the housings ensure safe enclosure of the collar to prevent accidental removal. The collar may include a plurality of fastening means to vary the size of the collar.

This is also achieved, according to a second aspect of the invention, by a collar for an animal comprising: an elongate strap member; and at least one housing, said at least one housing accommodating at least one sensor means for monitoring at least one characteristic of an animal, wherein at least a part of said elongate strap member comprises a semi-rigid structure for fitting around the neck of said animal.

The semi-rigid structure provides a collar which more readily conforms to the shape of the animal's neck to minimise the movement of the housing that provide comfort to the animal and minimises erroneous sensory data.

This is also achieved according to a third aspect of the present invention by a collar for an animal comprising: a semi-rigid structure for fitting around the neck of an animal; and a first housing and a second housing at each end of the semi-rigid structure such that, when the collar is fitted around the neck of an animal, the first and second housings are located in close proximity at the underside of the animal's neck.

The positioning of the housing enables more even distribution of weight of the collar which is more comfortable to the animal. The close proximity of the housings minimises the effect of impact of the housing minimising damage to the collar and harm to the animal.

This is also achieved according to a fourth aspect of the present invention by a collar for an animal comprising a semi-rigid structure for fitting around the neck of an animal, the semi-rigid structure comprises at least two platforms for positioning sensors and/or antennae in predetermined locations.

The semi-rigid structure of the collar enables easier mounting of sensors and/or antennas around the collar so that their location can be optimised.

The platforms or additional housings may be shaped to conform to the shape of natural recesses at the upper side area of the animal's neck. This provides stability as well as safe and convenient locations for sensory devices, antennae and delicate circuitry.

A self-tensioning fastening means may be provided by a guide means through which one end of the elongate strap member may be passed and held to maintain tension within the elongate strap member. The weight of the housings at each end of the elongate strap member act as a ballast to stabilise the collar.

This is also achieved according to a fourth aspect of the present invention by a system for monitoring activities of at least one animal comprising a base station and a remote station, the remote station comprising at least one sensor; processing means for collecting sensory data from the at least one sensor; and antenna means for wirelessly communicating collected sensory data to the base station, wherein the remote station is housed in the collar according to the, first, second and third aspects.

The collar is very effective in an animal monitoring system in which the animal is desired to wear a plurality of sensors for monitoring various aspects of behaviour to provide a stockman with complete data to assist in care management of the animal.

BRIEF DESCRIPTION OF DRAWINGS

For a more complete understanding of the present invention, reference is now made to the following description taken in conjunction with the accompanying drawings in which.

DETAILED DESCRIPTION OF EMBODIMENTS OF THE INVENTION

Figure 1:
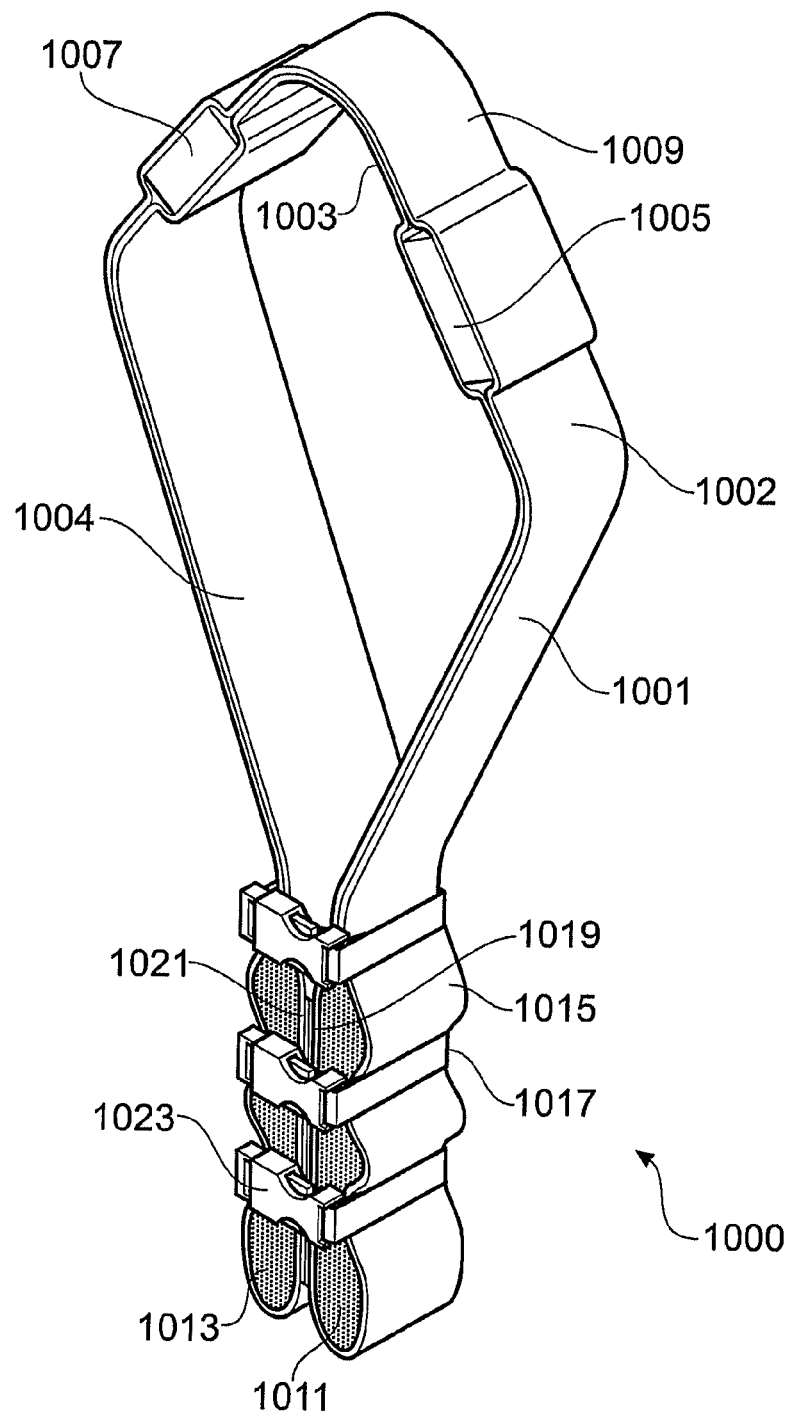
FIG. 1 is a perspective view of the collar according to a first embodiment of the present invention.

With reference to FIG. 1, a first embodiment of the collar is shown. The collar 1000 comprises an elongate strap number 1001. The elongate strap member comprises first and second flexible strap portions 1002, 1004 and a semi-rigid chassis 1003. Although the first and second flexible strap portions 1002, 1004 are drawn having a predefined shape, these flexible strap portions 1002, 1004 are completely flexible and have no preformed shape. The semi-rigid chassis 1002 comprises two third housings 1005, 1007. The chassis 1003 is formed of plastic, carbon fibre material or resin impregnated fabric or webbing for example. This allows some distortion of this part of the collar whilst maintaining its general shape so as to conform and mould itself around the neck of the animal increasing stability of the collar. The chassis 1003 is sealed within an outer sheath layer 1009 formed of a breathable, waterproof, resilient, abrasive resistant material. The outer sheath layer 1009 may be formed of a composite of fabric and wire layers which is impregnated with a resin or a suitable fabric impregnated with a resin. The third housings 1005, 1007 may be mounted on platforms at each end of the semi-rigid chassis 1003 or may be integral with the semi-rigid chassis 1003 and are coated by outer sheath layer 1009. The third housings 1005, 1007 house circuitry, an antenna and/or sensors such as 3-axis accelerometer. The third housings 1005, 1007 are positioned at 90° to each other.

The collar 1000 further comprises first and second housings 1011, 1013 accommodating a power source. Power cables are provided between the first and second housings 1011, 1013 within the fabric forming the first and second flexible strap portions 1002, 1004 to connect a power source housed in the first and second housings 1011, 1013 and circuitry housed in the third housings 1005, 1007. The first and second housing 1011, 1013 are essentially similar. They comprise a plurality of batteries. Although 3 batteries are shown here, it can be appreciated that any number of batteries may be utilised in the collar. The batteries of each housing are encased in resin and coated with an abrasive resistant material to protect the batteries from the environment. The batteries are encased with spaces therebetween. The batteries forming protrusions 1015 and the spaces therebetween forming corresponding recesses 1017 on one side of the housings 1011, 1013 and substantially flat on the opposing side 1019, 1021 of the housings 1011, 1013. The protrusions 1015 extend outwardly of the collar 1000.

The webbing fabrics of the elongate strap member 1001 extends over and around the first and second housings 1011, 1013. Substantially flat surfaces 1019, 1021 face innermost. These inner facing surfaces 1019, 1021 comprise a releasable fastening means such as Velcro®.

Each recess 1017 of the first and second housings 1011, 1013 comprises a releasable fastening means 1023 such as a clip, cable tie or the like.

The collar 1000 is fitted onto the back of the animal neck with the first and second housing 1011, 1013 apart in an open position such that the third housings 1005, 1007 rest in natural recesses at either side at the top of the animal's neck. The first and second flexible strap portions 1002, 1004 extend down and around the animal's neck. The inner surface 1019, 1021 of the first and second housings 1011, 1013 are releasably adhered together at the underside of the animal's neck to assist in aligning the housings and the fastening means 1023 are engaged into the closed position as shown in FIG. 1 to interlock the first and second housings 1011, 1013 together.

To accommodate varying size of neck, the upper one of the fastening means 1023 may be left open to provide a larger size collar as required.

The first and second housings 1011, 1013 are easily inserted into the loop of fabric of the collar and plugged in the power cables within the collar and easily removed to enable easy changing of the power source.

Figure 2:
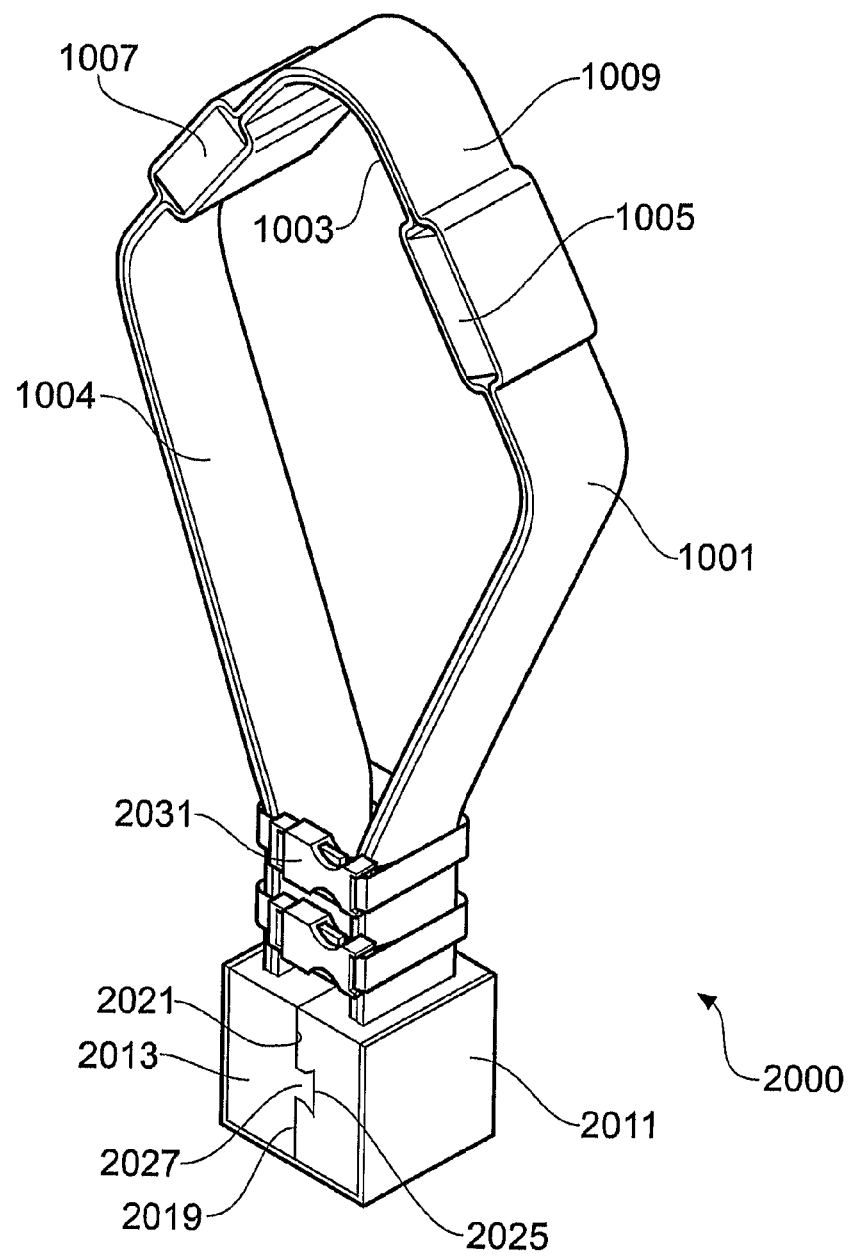
FIG. 2 is a perspective view of the collar according to a second embodiment of the present invention.

The second embodiment of the invention is shown in FIG. 2. The collar 2000 comprises an elongate strap member 1001 which is similar to that of the first embodiment and hence has the same reference numerals and will not be described in detail here. The difference between the collar 2000 of the second embodiment and the collar 1000 of the first embodiment is that the first and second housing 2011, 2013 of the collar 2000 are generally rectangular in shape.

The inner surface 2019 of the first housing 2011 comprises a shaped recess 2025. The inner surface 2021 of the second housing 2013 comprises a complementary shaped projection 2027. The recess 2025 and the complementary protection 2027 are shaped such that the first and second housings 2011, 2013 interlock together such that they cannot be pulled apart but can be released by sliding one housing relative to the other, such as a "dovetail".

The first and second housings 2011, 2013 are coated with a layer 2029 of abrasive resistant material.

The collar 2000 further comprises a plurality of releasable fastening means 2031, such as a clip or the like. Although FIG. 2 illustrates two fastening means 2031, it can be appreciated that any number of fastening means may be utilised.

The collar 2000 is fitted around the animal's neck similar to that of the first embodiment. Again, the size of the collar 2000 can be varied by changing the number of fastening means 2031 that are engaged.

Figure 3:
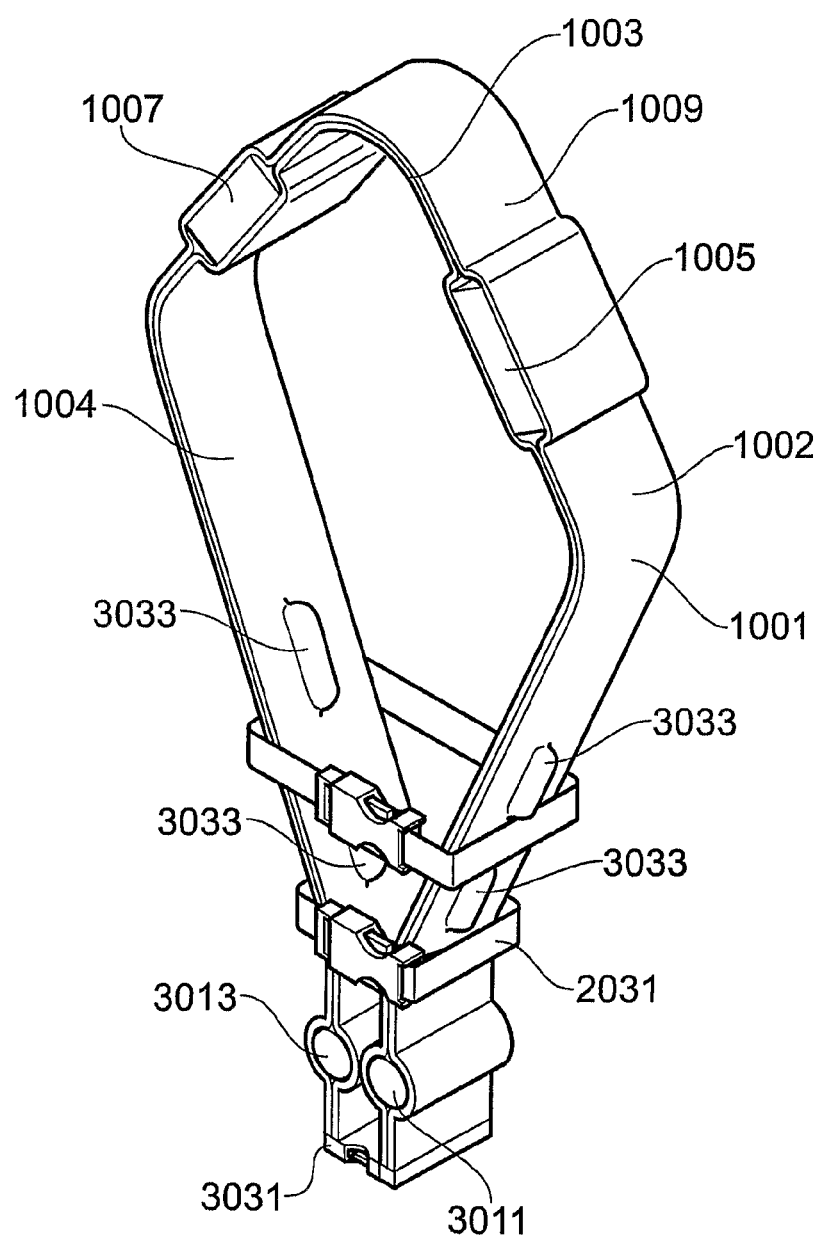
FIG. 3 is a perspective view of the collar according to a third embodiment of the present invention.

A third embodiment is shown in FIG. 3. The collar 3000 comprises an elongate strap member 1001 which is similar to that of the first and second embodiments and hence has the same reference numerals and will not be described in detail here. The difference between the collar 3000 of the third embodiment and the collars 1000, 2000 of the first and second embodiments is that the first and second housings 3011, 3013 of the collar 3000 comprise a single battery encased in a resin. The fabric of the first and second flexible strap portions 1002, 1004 extend around the first and second housings 3011, 3013 and terminates with a releasable fastener 3031 which interlocks the first and second housings 3011, 3013 together.

The collar 3000 further comprises additional battery housing which are integrated into the first and second flexible strap portions 1002, 1004 as shown by the protrusions 3033. Each additional battery housing is positioned such that the batteries lie in a general longitudinal direction in line with the elongate strap member 1001. The additional batteries have spaces therebetween in which releasable fastening means 2031 are attached.

The collar 3000 is fitted around the animal's neck similar to that of the first and second embodiments.

Figure 4:
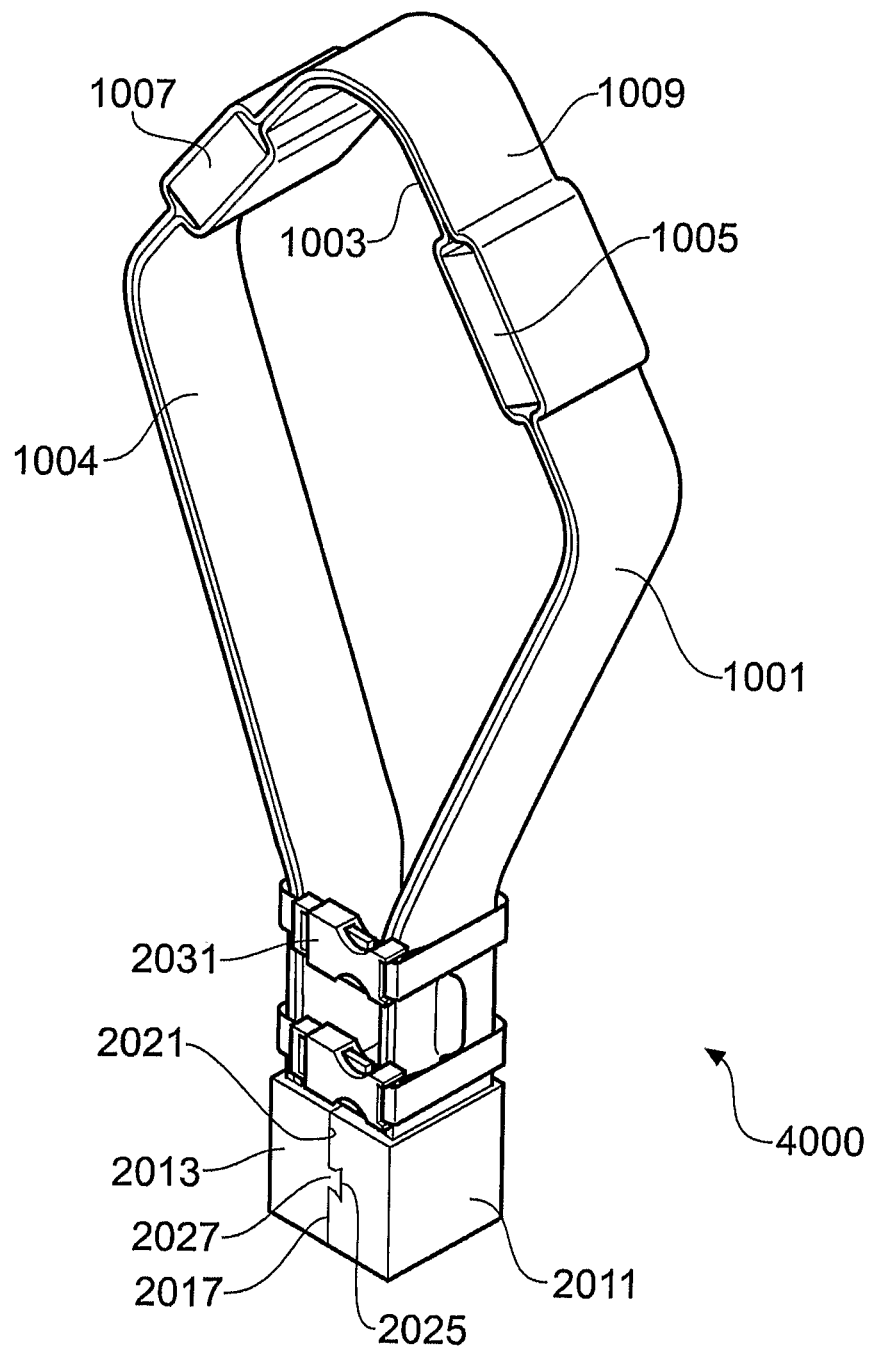
FIG. 4 is a perspective view of the collar according to a fourth embodiment of the present invention.

The fourth embodiment of the invention is shown in FIG. 4. The collar 4000 is similar to the collar 2000 of the second embodiment and hence has the same reference numerals and will not be described in detail here. The difference between the collar 4000 of the fourth embodiment and the collar 2000 of the second embodiment is that additional batteries are housed within the webbing of the first and second flexible strap portions.

Figure 5:
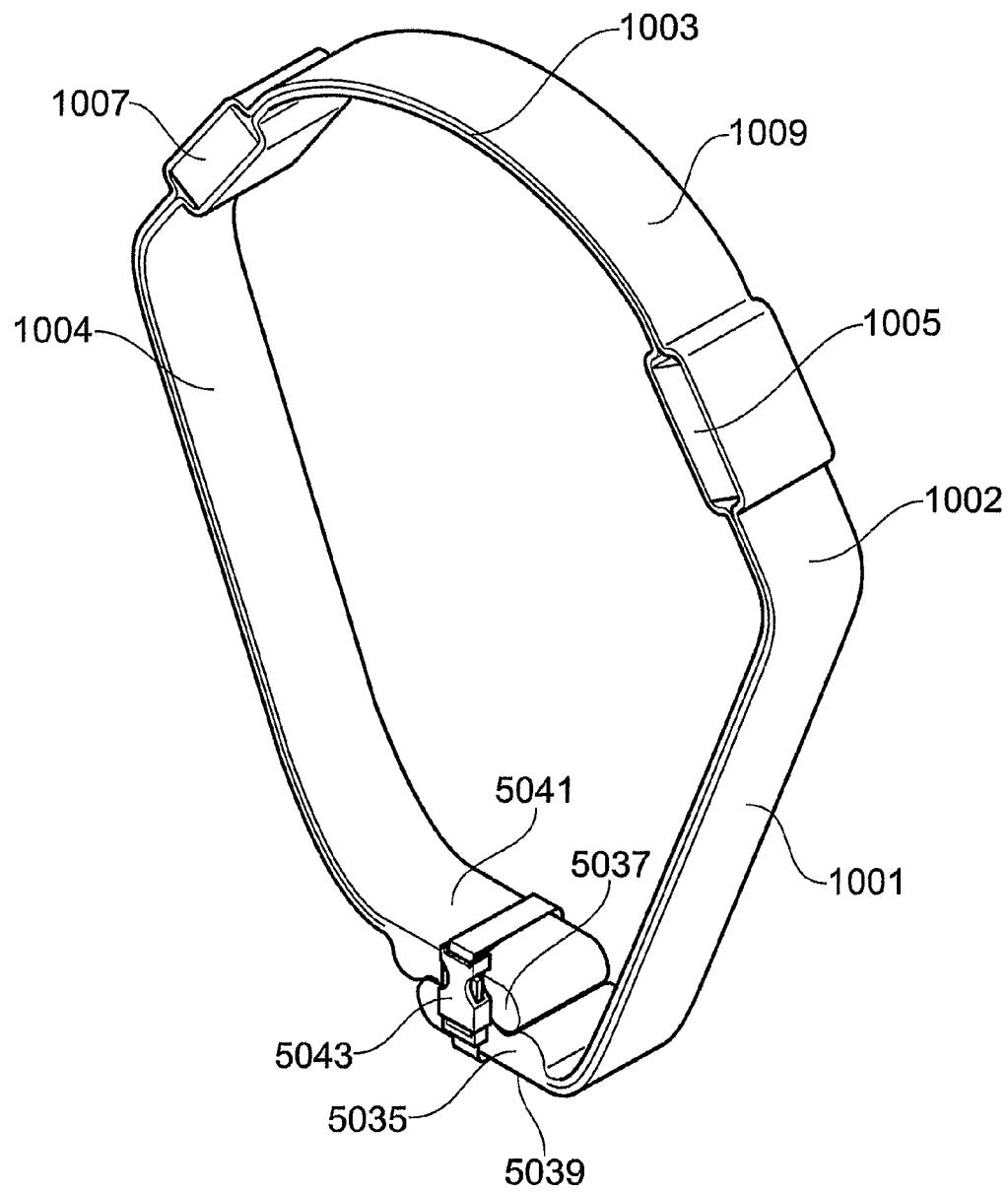
FIG. 5 is a perspective view of the collar according to a fifth embodiment of the present invention.

A fifth embodiment of the invention is shown in FIG. 5. The collar 5000 comprises an elongate strap number 1001 which is similar to that of the first embodiment and hence has the same reference numerals and will not be described in detail here. The difference between the collar 5000 of the fifth embodiment and the collar 1000 of the first embodiment is that the first and second housings 5035, 5037 are located such that the substantially flat side 5039 of the first housing 5035 faces outermost and that the substantially flat side 5041 of the second housing 5037 is innermost such that the protrusions of the batteries on the other sides of the housing interlock and are secured by a releasable fastening means 5043.

The collar 5000 is fitted around the animal's neck such that the first and second housings 5035, 5037 rest in the proximity of the under side of the animal's neck.

The weight of the first and second housings of the first to fifth embodiments acts as a ballast to help reduce slippage of the collar. The stability of the collar is further improved by resting the third housings in recesses at the top of the animal's neck and by the semi-rigid chassis which generally conforms to the shape of the animal's neck. The positioning of the third housings at the top of the animal's neck enable antennae housed within to have improved line of sight and to minimise the damage caused by hitting metal bars of feeding grills. Interlocking of the first and second housing ensures that the collar is securely fastened to prevent accidental removal. The variations of fastening means enable variation in neck sizes to be accommodated.

Figure 6:
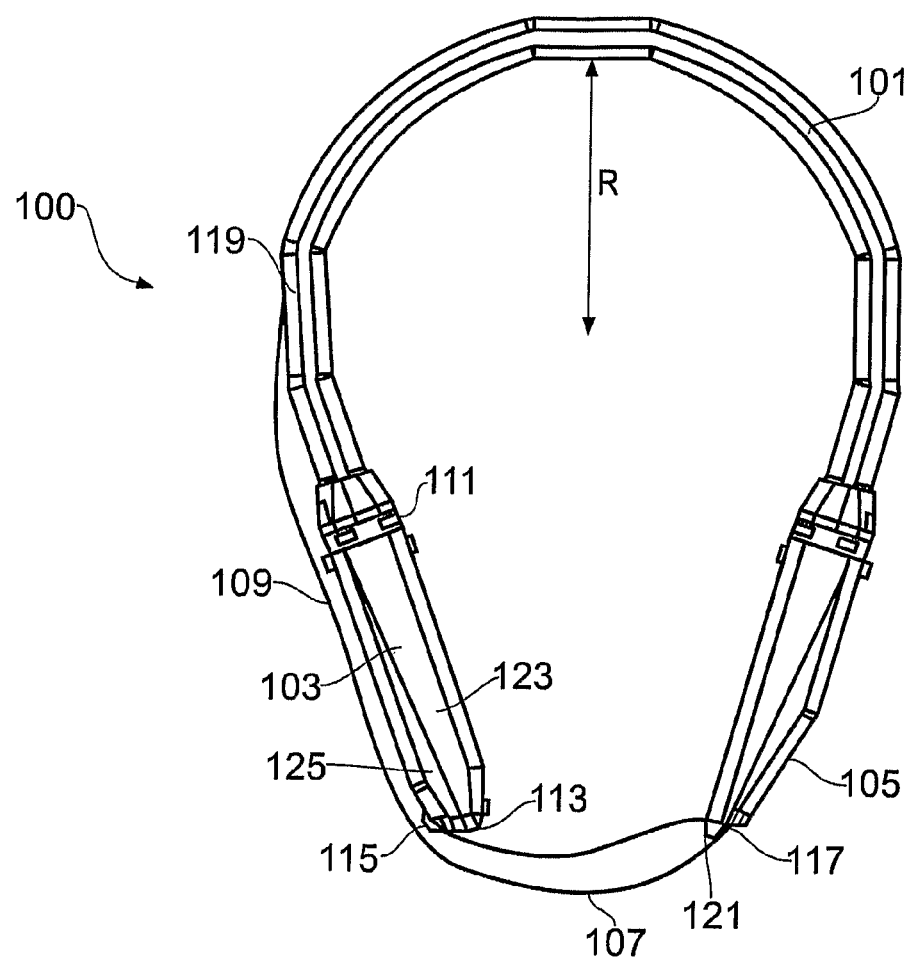
FIG. 6 is a front view of the collar according to a sixth embodiment of the present invention.
Figure 7:
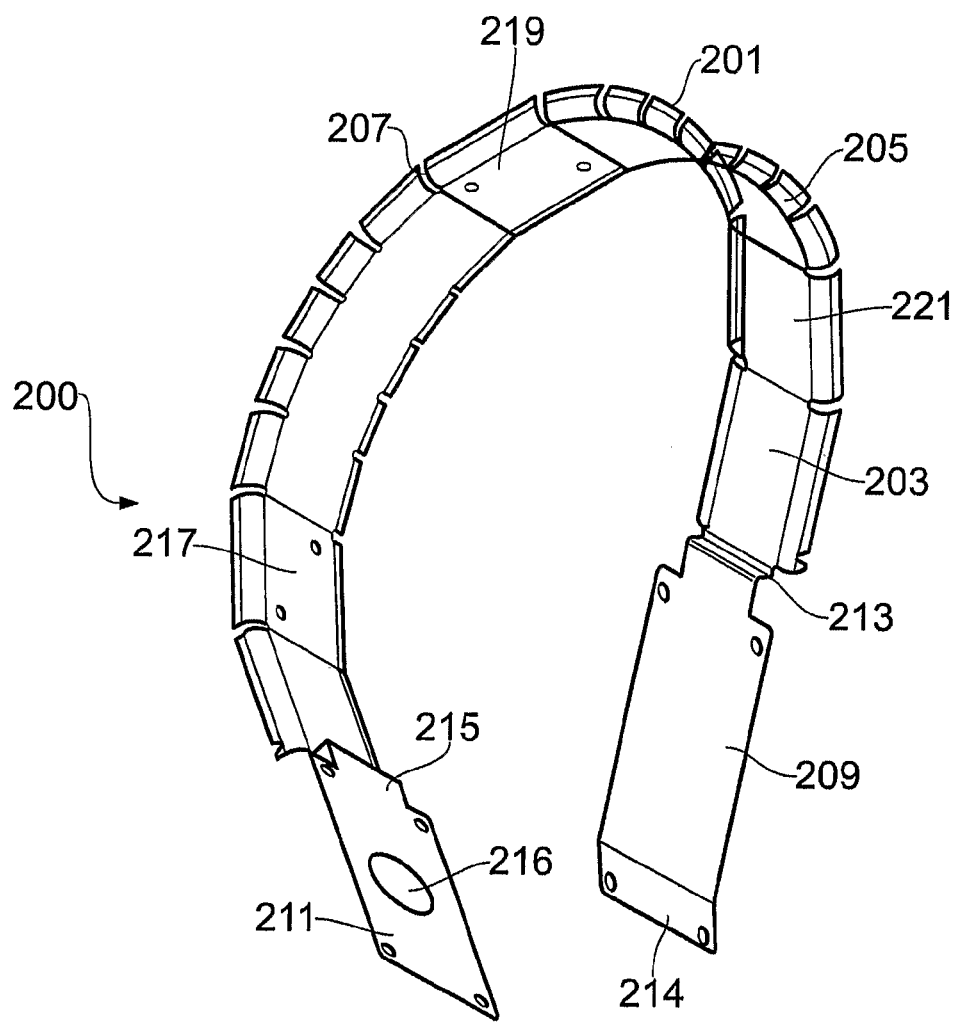
FIG. 7 is a perspective view of the semi-rigid structure of the collar of FIG. 6.
Figure 8:
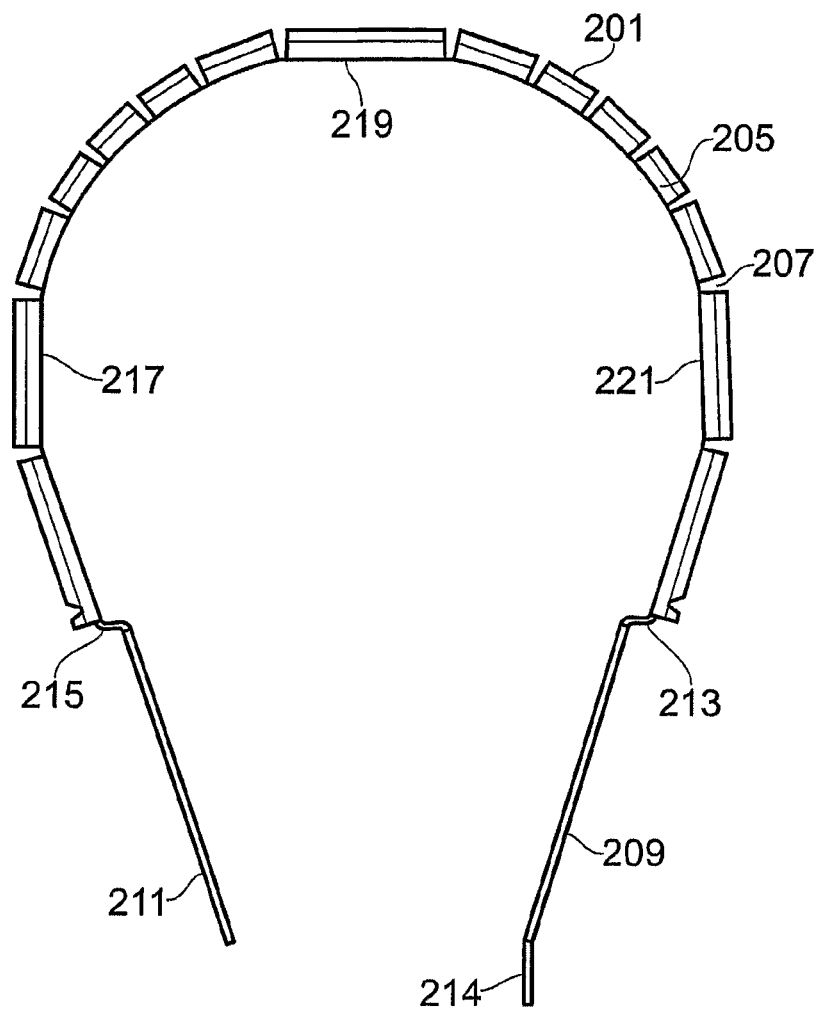
FIG. 8 is a front view of the semi-rigid structure of FIG. 7.

As shown in FIGS. 6 to 8, the collar 100 according to a sixth embodiment of the present invention comprises an elongate strap member 101 a first housing 103 and a second housing 105 at each end of the elongate strap member 101. The elongate strap member 101 comprises a semi-rigid structure 200 as shown, for example, in FIGS. 7 and 8. The semi-rigid structure is preformed to give the elongate strap member 101. The elongate strap number 101 has a shape which is a substantially tear-drop shape having an upper curved surface which has a radius R which is substantially equal to the average radius of at least the topside of an animal's neck.

The collar further comprises a flexible strap 107. One end 109 of the flexible strap 107 is fixedly attached to the proximal end 111 of the second housing 105 on the outer surface of the second housing 105. The strap 107 extends from the proximal end 111 of the second housing 105 to the distal end 113 of the second housing 105 along the outer surface of the second housing 105. The innermost surface of the strap 107 is removeably attached to the outer surface of the second housing 105 by for example Velcro® or other suitable means. The strap 107 passes under a guide 115 located toward the distal end 113 of the second housing 105. In this way the strap 107 is flush against the outer surface of the second housing 105 such that looping of the strap 107 does not occur preventing it from catching and pulling the strap causing it to break and the collar to fall off.

The strap 107 extends from the guide 115 and the distal end 113 of the second housing 105 to the distal end 117 of the first housing 103. The strap 107 feeds through a loop 121 at the distal end 117 of the first housing 103, and feeds back toward the distal end 113 of the second housing 105 and is removeably attached to the outer surface of the elongate member 101 at a location 119 above the second housing 105.

The collar is formed of a semi-rigid structure 200 which is shaped to form the substantially tear-drop shape of the collar for fitting around the neck of the animal. The semi-rigid structure 200 is formed of electrogalvanised steel or carbon fibre of approximately 1-2 mm thick, or other suitable material. The semi-rigid structure 200 comprises an elongate U-shaped member 201 having a substantially flat base portion 203 and upwardly extending sidewalls 205. The edge between the base portion 203 and sidewalls 205 is rounded. The side walls 205 comprise a plurality of notches 207 which provide the semi-rigid structure 200 with flexibility to enable it to be bent to form the substantially circular shape and conform more readily to the shape of the animal's neck. Each end of the elongate U-shaped member 201 comprises a first and second base elements 209, 211. The first and second base elements 209, 211 are integral with the elongate U-shaped member 201 via a step portion 213, 215.

The first and second base elements 209, 211 are substantially flat and rectangular in shape, extend longitudinally from the ends of the semi-rigid structure 200, and form the platforms for the first and second housing 103, 105, respectively. The first base element 209 further comprises a lip portion 214 at its distal end for accommodating the loop 121. The second base element 211 comprises a hole 216, centrally located within the second base element 211.

The elongate U-shaped member 201 comprises a plurality of platforms 217, 219, 221 for accommodating further housings (not shown here). Although three platforms are illustrated here it can be appreciated that the U-shaped member 201 may accommodate any number of platforms as appropriate.

The first and second housings 103, 105 formed on the first and second base elements 209, 211 house a power source, such as for example a battery pack, and electronic circuitry, respectively. The weight distribution between the housings is made as even as possible. The housings 103, 105 are formed of premoulded plastic. The housings 103, 105 form a second enclosure for housing the battery pack and electronic circuitry. The first housing 103 is formed of a first lower portion 123 and a first upper portion 125, The first upper portion 125 is removeably attached to the first lower portion 123 and houses the batteries. The removable properties of the first upper portion 125 allows for easy replacement of the batteries. The first lower portion 123 is fixedly attached to the first base element 209 by means of screws or any other suitable fixing means. The distal end of the first housing 103 tapers inwardly slightly to provide a rounded end of the housing to reduce the effect of impact or abrasiveness. Further the outer edges of the collar and housings have rounded contours to reduce the effect of impact.

The second housing 105 is fixedly attached to the second base element 211 by means of screws or other suitable fixing means. The outer surface of the second housing 105 is tapered inwardly toward the distal end 117 of the second housing 105 to minimise the effect of impact of the housing. The second housing 105 further may comprise a window (not shown here) to allow at least one LED to illuminate through to indicate correct operation of the circuitry. The hole 215 within the second base element 211 accommodates a microphone for monitoring physiological characteristics, such as breathing rate, and vocalisation of the animal. The microphone is then positioned close as possible to the animal to minimise the interference of other noises.

The platforms 217, 219, 221 of the elongate U-shaped member 201 have a third, fourth and fifth housings (not shown here) fixedly attached thereto. The third and fifth housings attached to the outer platforms 217, 221, are substantially identical and positioned at the same distance from the first and second housings 103, 105, respectively. The fourth housing is fixedly attached to the platform 219 positioned in the centre of the elongate U-shaped member 201 equidistant from the first and second housings.

Similar to the first and second housings 103, 105, these additional housings are formed of premoulded plastic to form a sealed enclosure. The third, fourth and fifth housings, each accommodate a 3-axis accelerometer; the fourth housing contains, in addition, an antenna. The third and fifth housings are positioned at 90° relative to the position of the fourth housing.

Wiring between the battery pack housing in the first housing 103 and the circuitry housed in the second, third, fourth and fifth housings is fed between the housings via the U-shaped elongate member 201. The wires are fed out of the first housing 103 via guides (not shown here) and then sealed in epoxy resin to maintain integrity of the seal of the housing to prevent ingress of water etc. Wiring fed in and out of the second housing 105 is similarly sealed. Wiring from the second housing 105 to the fourth housing carries sensory data for transmission by the antenna. Alternatively, sensory data may be stored on a removable memory card housed within the second housing 105. The battery pack therefore provides power to the circuitry in the second, third, fourth and fifth housings. The semi-rigid structure 200 is completely encased in an abrasive resistant material to protect the steel structure, wiring and housings.

In an alternative embodiment, the U-shaped member is replaced by a more flexible, light weight structure of a pair of elongate steel rods which extend the length of the elongate strap member 101 between the first and second housings 103, 105 in parallel at the outer edges of the elongate strap member 101. The semi-rigid structure is strengthened by a plurality of equispaced cross members. Platforms for the third, fourth and fifth housings are attached to the rods and cross members.

In a further embodiment, the elongate strap number and the housings are formed of a premoulded plastic to form an integral unit in which the semi-rigid structure is inserted.

In use, the collar is fitted around the neck of the animal, for example a cow, such that the first and second housings 103, 105 are positioned on the underside of the animal's neck. The radius R of the collar enables the collar to comfortably rest around the top of the animal's neck. The strap 107 is then looped through the loop 121 and releasably attached to the outer surface of the elongate strap member 101 at location 119 such that the collar is releasably fitted around the animal's neck with the distal ends 113, 117 of the first and second housing 103, 105 being in close proximity.

As the collar 100 is worn by the animal, the body heat, movement etc. of the animal causes the semi-rigid structure 200 to bend and generally conform to the shape of the animal's neck. The collar may be formed of smart materials such as Memoflex® metals. The collar is easily removed by releasing the strap 107 and lifting the collar off the animal's neck for ease of maintenance, changing batteries etc.

Figure 9:
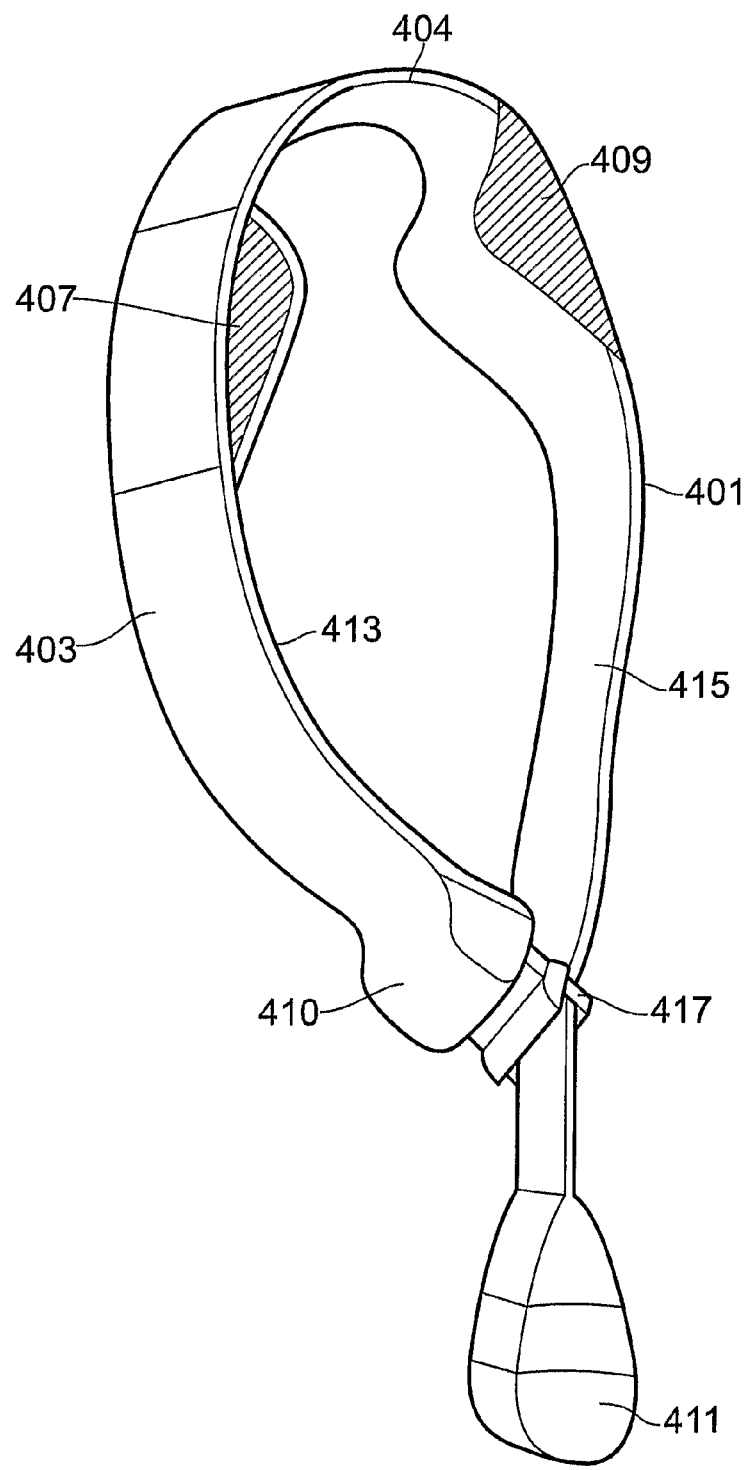
FIG. 9 is a perspective view of the collar according to a seventh embodiment of the present invention.
Figure 10:
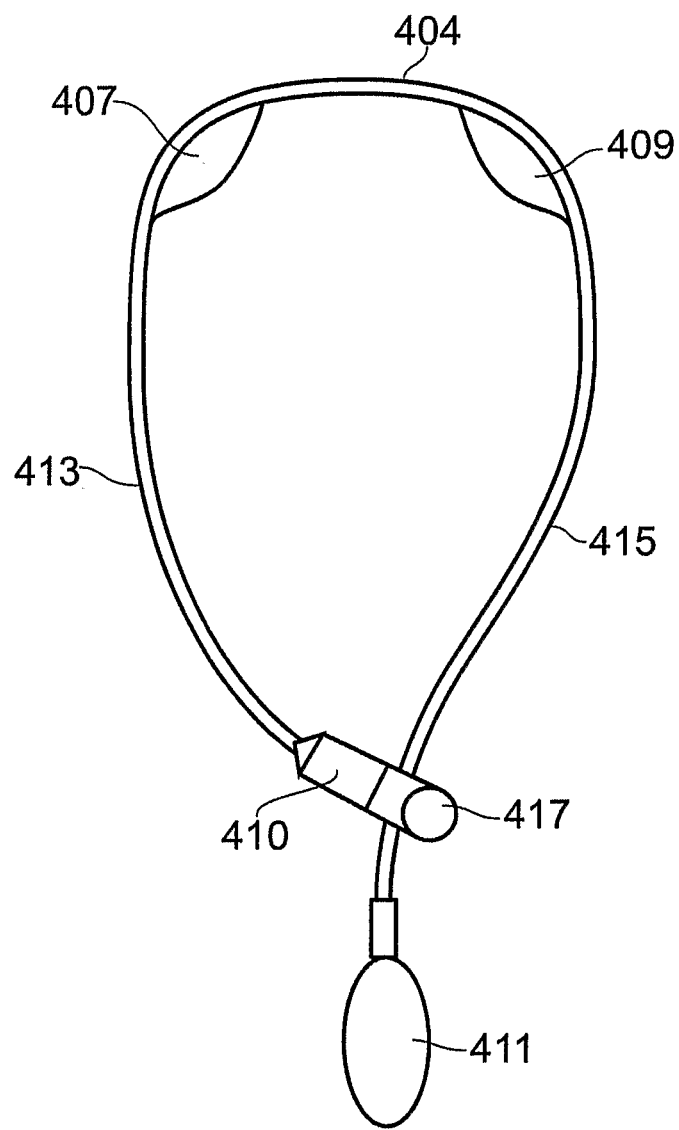
FIG. 10 is a sectional, front view of the collar of FIG. 9.
Figure 11:
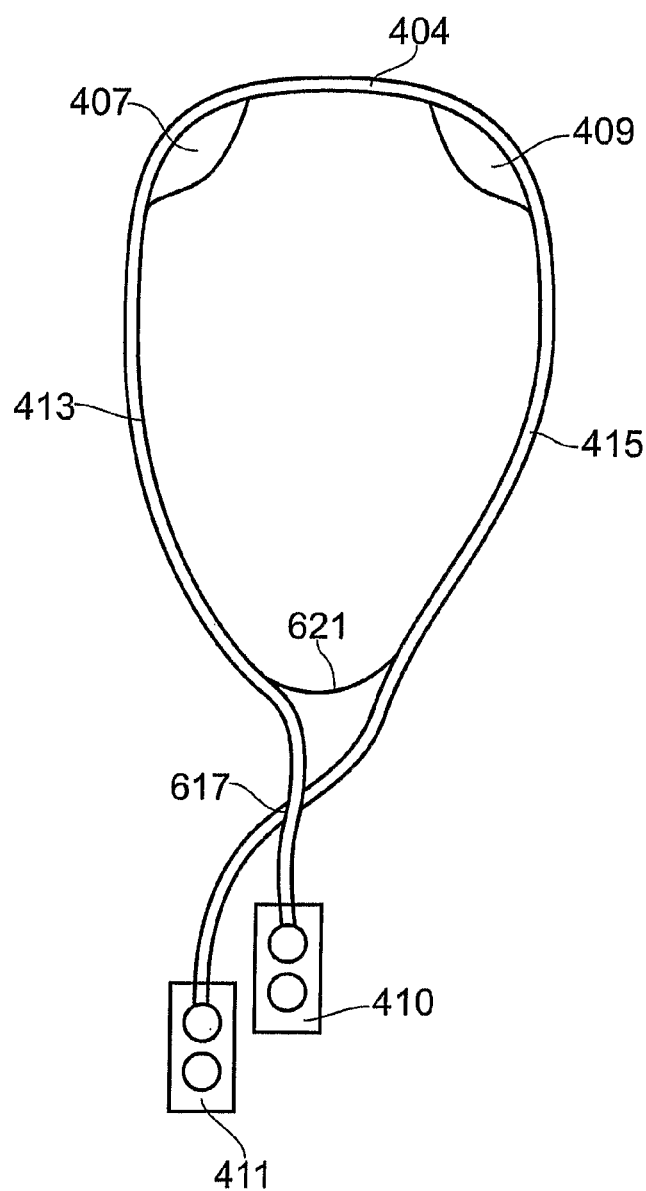
FIG. 11 is a sectional, front view of an alternative collar of FIG. 9.

With reference to FIGS. 9 to 15, a seventh embodiment and alternatives of the seventh embodiment are shown. As shown in FIG. 9, the collar 400 comprises an elongate strap member 401 in which a part comprises a semi-rigid chassis 404 between third housings 407, 409. The chassis 404 is formed of plastic, carbon fibre material or resin impregnated fabric or webbing for example. This allows some distortion of the collar whilst maintaining its general shape so as to conform and mould itself around the neck of the animal. This chassis 404 is sealed within an outer sheath layer 403 formed of a breathable, waterproof, resilient, abrasive resistant material. This may be formed of a composite of fabric and wire layers which may impregnated with a resin or a suitable fabric impregnated with a resin.

The collar 400 further comprises a first and second housing 410, 411. Power cables 405 feed from the first and second housings 410, 411 to the third housings 407, 409. Cabling 605 is also provided between the first and second housings 410, 411 and each of the third housings 407, 409. The power cables 405 and the cabling 605 are sealed within the outer sheath layer 403. The power cables 405, 605 and the outer sheath layer 403 form first and second flexible straps 413, 415. The first housing 410 is provided at the distal end of the first flexible strap 413 and the second housing is provided at the distal end of the second flexible strap 415.

Figure 13:
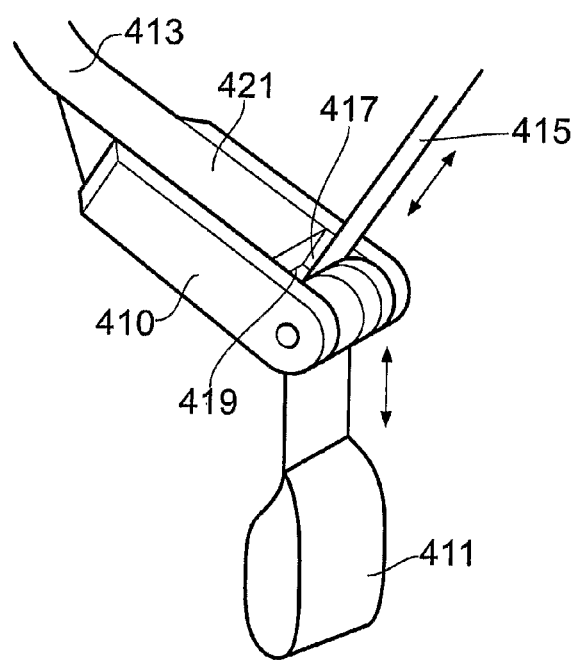
FIG. 13 is a perspective view of details of the fastening means of the collar of FIG. 9.

The first housing 410 comprises a guide means 417 at the distal end of the first housing 410. With reference to FIG. 13, the guide means 417 comprises a slot 419 toward the distal end of the first housing 410. The second flexible strap 415 passes through the slot 419 of the guide means such that the second housing 411 extend downward by virtue of its weight from the first housing 410. The second flexible strap 415 is held into its required position by sliding a latch 421 toward the distal end of the housing 410 over the slot 419 to catch the second flexible strap 415 within the slot 419 by friction. It is held such that the second flexible strap 415 can slide if required to maintain the tension within the collar.

Figure 12:
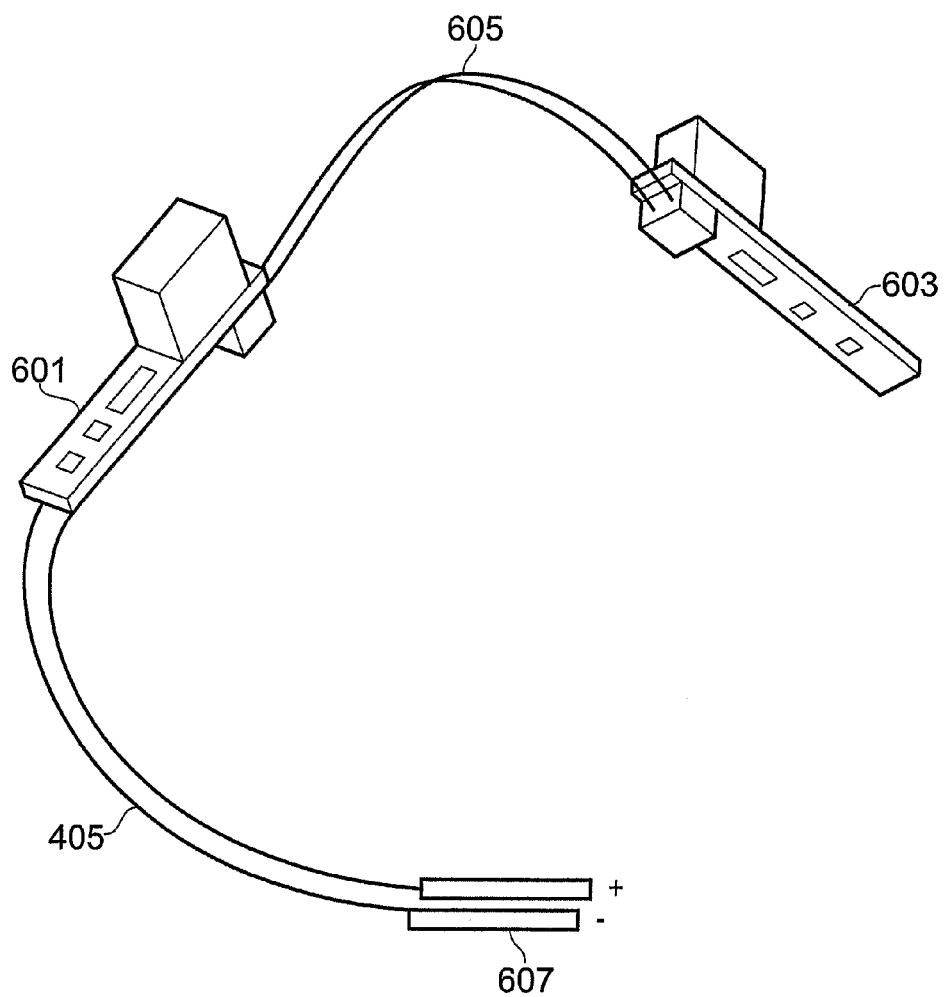
FIG. 12 is a perspective view of details of the collar of FIG. 9.
Figure 14:
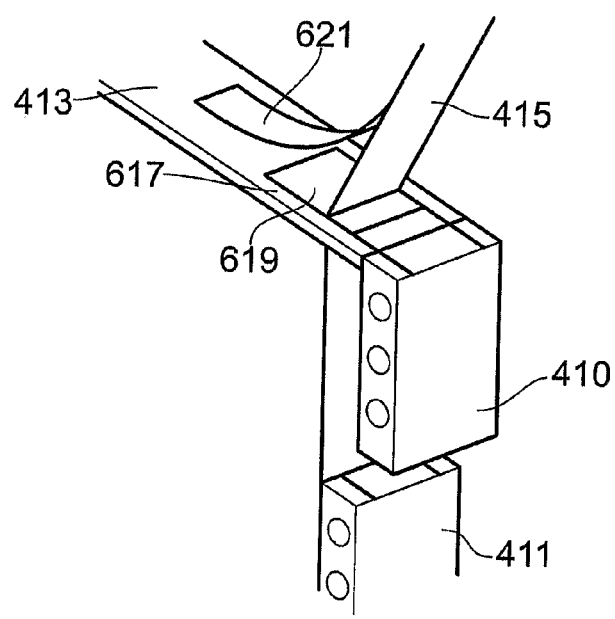
FIG. 14 is a perspective view of the fastening means of the alternative collar of FIG. 11.

In an alternative arrangement, as shown in FIGS. 12 and 14, the collar is similar in arrangement to that described above except that the guide means 617 comprises a slot 619 formed in the first flexible strap 413 near the first housing 410. The slot 619 is formed in the first flexible strap 413 to be large enough to allow the second housing 411 to pass through. The second flexible strap 415 is held into its required position by latch means 621 such as a Velcro® tab. This allows slight movement of the second flexible strap 415 to maintain tension within the collar without loosening the collar. The third housings 407, 411 accommodate circuitry on flexible circuit boards 601, 603 within the semi rigid chassis 404. The third housings 407, 411 are sealed within the outer sheath layer 403. The third housings 407, 411 are similar in shape and size.

Figure 15:
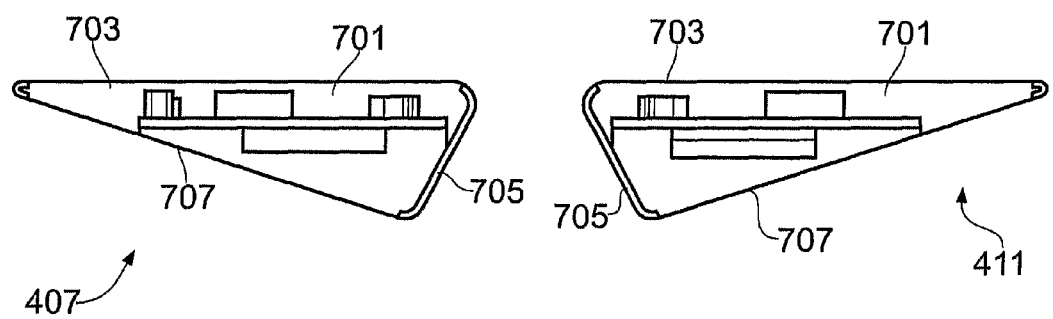
FIG. 15 is a sectional view of the housings of the collar of FIGS. 9 and 11.

As shown in FIG. 15, they comprise a housing 701 having a generally triangular cross section in which each side of the housing forms a generally right-angled triangular shape. The outer, hypotenuse surface 703 of the housing 701 lies outermost either side of the top of the neck of the animal. The shorter surfaces 705 of each housing 701 face each other either side of the top of the neck of the animal. The surface 707 defined by the remaining edge of the triangular cross section is innermost to the collar extending outwardly away from the top of the neck of the animal. A shaped inner cushioning layer 413 is formed around the surfaces 705 and 707 of each of the housings to provide comfort to the animal. The inner, cushioning layer 413 may be formed of a foam-like material within the outer sheath layer 403.

The first of the third housings 407 accommodates sensors such as a 3-axis accelerometer and an antenna. The second of the third housings 409 accommodates an antenna and processor for power control and signal processing etc. The first and second housings 410, 411 accommodate a power source such as batteries. The collar may also comprise electrodes 417, 419 for ECG monitoring at locations in close proximity to the animals skin for example at the uppermost part of the animal's neck between the first and third housings 407, 411 and/or at the lowermost part of the animal's neck.

In use, the collar is fitted around the neck of the animal such that the third housings 407, 409 are located in natural recesses either side of the raised neck ligament of the animal at the uppermost point of the animal's neck. The inner facing surfaces 705 of each housing rest against the raised ligament. The first and second flexible straps 413 and 415 are drawn together via the guide means 417 or 617 at the underside of the animal's neck and fixed such that the collar 400 fits snugly around the animal's neck.

With this arrangement, the electronic circuitry and the antennae are safely and conveniently located at the top of the animal's neck such that the bulk of the housing does not hit metal bars of feeding grilles and thus minimising damage and more conveniently positioned to minimise interference of the antennae and improve their line of sight. The guide means 417 and 617 and the weight of the first and second housings 410, 411 provide a self-tensioning fastening which maintains the fusion in the collar. Further, the weight of the first and second housing 410, 411 acts as a ballast to maintain stability of the collar.

Figure 16:
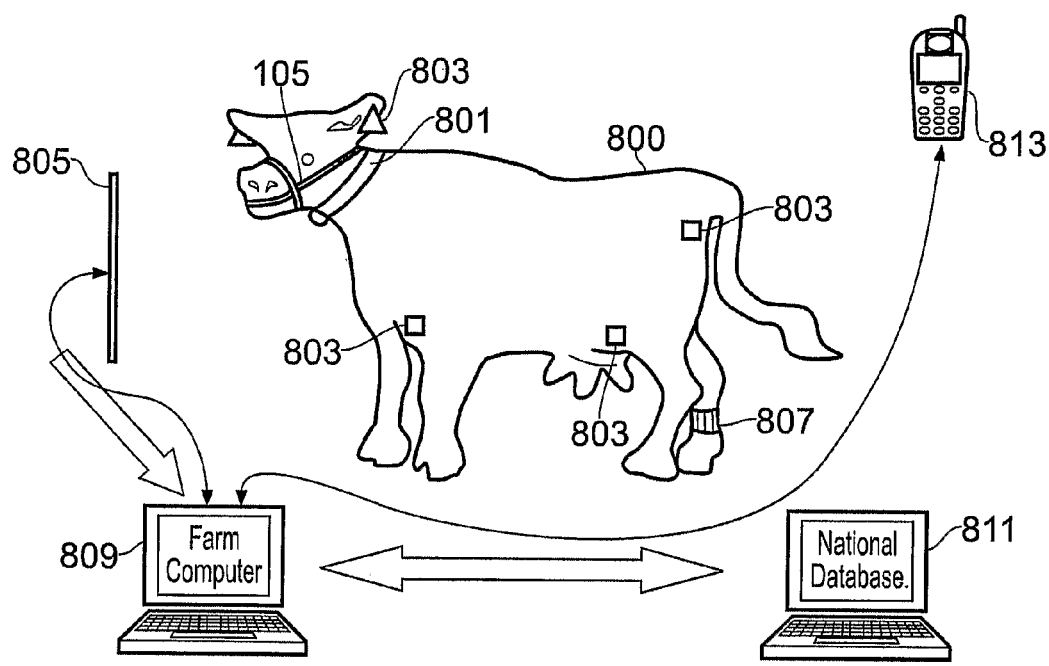
FIG. 16 is a simplified schematic of a system for monitoring characteristics of animal wearing the collar according to the embodiments of the present invention.

The collar may be utilised in a system for monitoring behavioural characteristics of an animal 800 as shown in FIG. 16. The collar 801, according to the embodiments above, is worn, semi permanently, by the animal.

The circuitry within any one of the housings of the collars described above includes a plurality of sensors for monitoring behavioural characteristics such as standing, walking, lying, oestrus, partition etc. As described above, the collar includes an antenna housing on the topside of the animal's neck to minimise interference and improve the line of sight of the antenna. The collar communicates, wirelessly with a network of sensors. The network of sensors includes sensors housed in the second, third and fifth housings as described above and the system also comprises remote sensors 803 located on and around the animal. The collar also communicates, wirelessly, with a base station 805. The base station 805 then communicates with a computer system 809, 811 or other mobile devices 813 to convey the behavioural information to a stockman for care management of the animal.

Although embodiments of the present invention have been illustrated in the accompanying drawings and described in the foregoing detailed description, it will be understood that the invention is not limited to the embodiments disclosed, but is capable of numerous modifications without departing from the scope of the invention as set out in the following claims.

The invention claimed is:
1. A collar for an animal comprising:
an elongate strap member; and
at least one housing, said at least one housing for accommodating at least one sensor means for monitoring at least one characteristic of an animal or antennae means, wherein at least a part of said elongate strap member comprises a semi-rigid structure for fitting around the neck of said animal, said semi-rigid structure comprising said at least one housing for sensor means or antennae means positioned around said semi-rigid structure, wherein at least one of said at least one housing for sensor means or antennae means is shaped such that, in use, it rests in a natural recess on the upper side area of the animal's neck.

2. The collar of claim 1, wherein the collar further comprises a first housing and a second housing at each end of said elongate strap member such that, when the collar is fitted around the neck of said animal, said first and second housings are located in close proximity in natural recesses on the upper side area of the animal's neck.

3. The collar according to claim 2, wherein any one of said first or second housings accommodate a power source.

4. The collar according to claim 2, wherein the collar further comprises at least one fastening means in the proximity of the first and second housings for fastening the ends of said elongate strap member together.

5. The collar according to claim 2, wherein the collar further comprises additional power sources located around and integral with said elongate strap member.

6. The collar according to claim 2, wherein said second housing accommodates electronics circuitry.

7. The collar according to claim 2, wherein each of said first and second housings comprising interlocking means such that said first housing releasably engages said second housing in the proximity of natural recesses on the upper side area of said animal's neck when the collar is fitted around said animal's neck.

8. The collar according to claim 7, wherein said interlocking means comprises at least one projection and at least one recess.

9. The collar according to claim 8, wherein said at least one projection is located on said first housing and said at least one recess is located on said housing such that said projection releasably engages within said recess.

10. The collar according to claim 8, wherein said interlocking means further comprises a fastening means for fastening said first and second housings together.

11. The collar according to claim 8, wherein said interlocking means comprises a plurality of projections and recesses, one of said plurality of projections and one of said plurality of recesses is located on said first housing and another of said plurality of projections and another of said plurality of recesses is located on said second housing.

12. The collar according to claim 11, wherein the plurality of projections are formed by housing at least one battery and said plurality of recesses are formed by spaces between said housed at least one battery.

13. The collar according to claim 11, wherein the interlocking means further comprises at least one fastening means located within the at least one of said plurality of recess of said first and second housing to fasten the first and second housings together.

14. The collar according to claim 1, wherein said semi-rigid structure conforms to the shape of said animal's neck.

15. The collar according to claim 1, wherein said semi-rigid structure comprises at least two platforms for positioning said at least one sensor means or antennae means in optimal locations.

16. The collar according to claim 1, wherein at least one other of said at least one housings is shaped such that it rests in another natural recess on the upper side area of the animal's neck.

17. The collar according to claim 1, wherein said at least one housing comprise at least two housings each of said at least two housings containing an accelerometer, said at least two housings being positioned at 90° to each other.

18. A system for monitoring activities of at least one animal comprising a base station and a remote station, the remote station comprising at least one sensor; processing means for collecting sensory data from the at least one sensor; and antenna means for wirelessly communicating collected sensory data to said base station, wherein said remote station is housed on a collar comprising a semi-rigid structure for fitting around the neck of said at least one animal, the semi-rigid structure comprising at least two platforms for positioning said sensor and said antenna means in predetermined locations, wherein said at least two platforms are shaped such that they rest in natural recesses on the upper side area of the animal's neck.

19. A collar for an animal comprising a semi-rigid structure for fitting around the neck of said animal, the semi-rigid structure comprises at least two platforms for positioning sensors or antennae in predetermined locations, wherein said at least two platforms are shaped such that they rest in natural recesses on the upper side area of the animal's neck.

20. The collar according to claim 19, wherein said at least two platforms each house an accelerometer and said at least two platforms are positioned at 90° to each other.

21. The collar according to claim 19, wherein said semi-rigid structure conforms to the shape of said animal's neck as it is worn.

22. The collar according to claim 19, wherein the collar is fitted around said animal's neck by means of an adjustable, flexible strap.

23. The collar according to claim 22, wherein the collar further comprises guide means having an adjustable latch means for adjustably joining the end of the flexible strap.

24. The collar according to claim 19, wherein said semi-rigid structure comprises a U-shaped cross section steel or carbon fibre member having a curved upper surface which has a radius substantially equal to the average radius of at least the top side of said animal's neck.

25. The collar according to claim 19, wherein said semi-rigid structure comprises a pair of rod members having a curved upper surface which has a radius substantially equal to the average radius of at least the top side of said animal's neck.

26. The collar according to claim 25, wherein said pair of rod members are laterally spaced by a plurality of cross members.

27. The collar according to claim 19, wherein said semi-rigid structure comprises a covering formed of an abrasive resistant material.

28. The collar according to claim 19, wherein at least part of the collar is formed of acid and alkaline resistant materials.

* * * * *